May 1, 1956 — M. ISAACSON — 2,743,508
COIL FORMING METHOD
Filed June 20, 1951 — 2 Sheets-Sheet 1

INVENTOR.
MAX ISAACSON
BY Dybvig & Dybvig
HIS ATTORNEYS

May 1, 1956 M. ISAACSON 2,743,508
COIL FORMING METHOD
Filed June 20, 1951 2 Sheets-Sheet 2
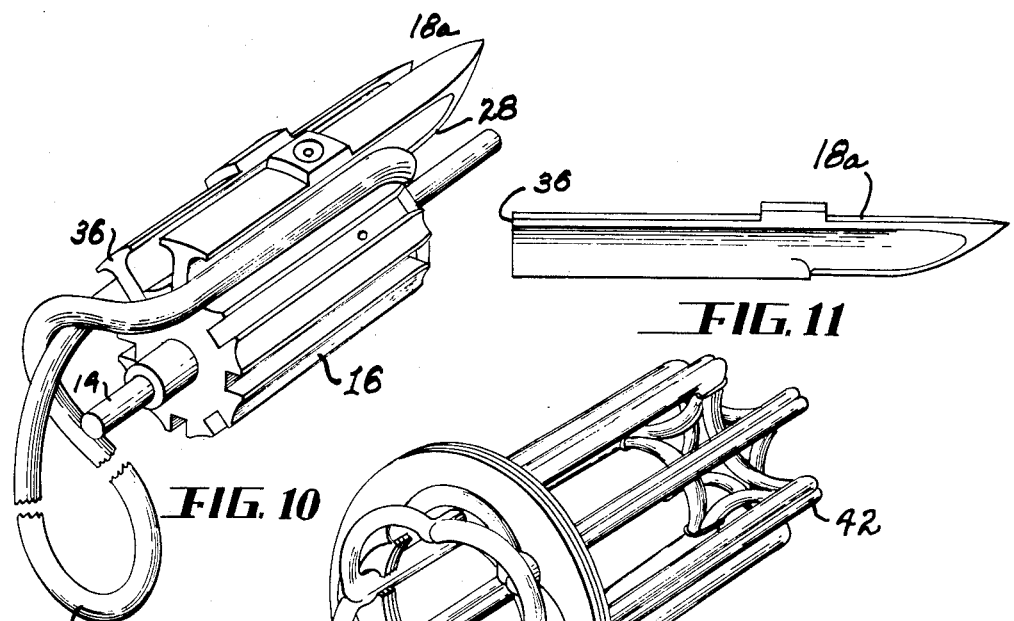
FIG. 10
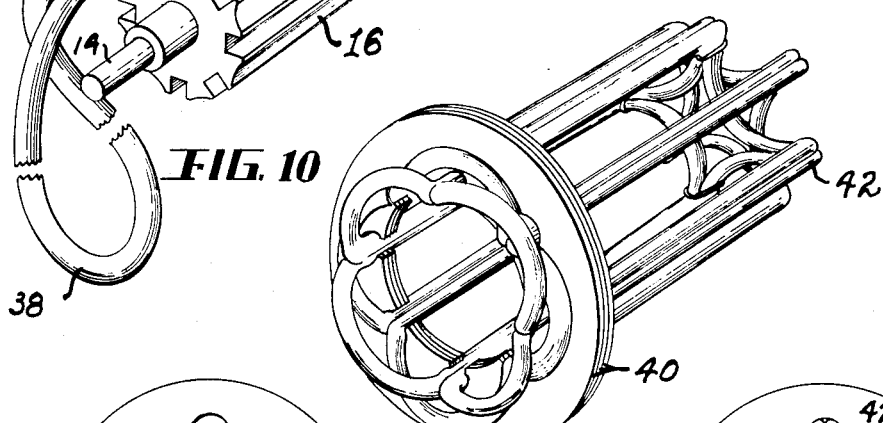
FIG. 11
FIG. 12
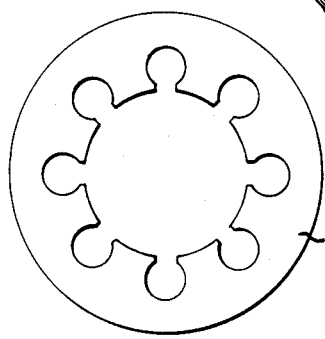
FIG. 13
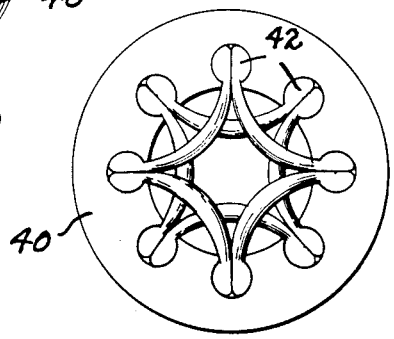
FIG. 14
INVENTOR.
MAX ISAACSON
BY Dybvig & Dybvig
HIS ATTORNEYS United States Patent Office 2,743,508
Patented May 1, 1956

2,743,508

COIL FORMING METHOD

Max Isaacson, Dayton, Ohio, assignor to Globe Industries, Inc., Dayton, Ohio, a corporation of Ohio Application June 20, 1951, Serial No. 232,641

8 Claims. (Cl. 29—155.57)

This invention relates to an electric motor and to the method and apparatus for manufacturing the motor.

The problem of manufacturing motor stators having a plurality of wound field coils evenly distributed throughout stator slots, in which the opening into the stator slot is relatively narrow in comparison with the width of the main portion of the slot, is particularly pronounced when manufacturing stators for miniature aircraft motors of the type in which the stators have an external diameter in the neighborhood of one inch. It is an object of this invention to solve this problem in a new and improved manner by preforming the coils before insertion into the slots in such a manner that the preformed coils may be slid into place from one end of the stator.

Another object of this invention is to provide a number of coils which have been preformed in such a manner that the sides of two coils may be simultaneously slid into place in a single coil slot without injuring the insulation on the fine wires forming the coils.

Another object of this invention is to provide an improved coil arrangement and method of manufacturing the coils which makes it possible to wrap the sides of the coils in insulation before inserting the coils in the coil slots.

A further object of this invention is to provide an improved type of mandrel for use in winding stator coils.

Still another object of this invention is to provide an improved construction and arrangement which makes it possible to first insert one series or set of preformed coils and then insert a second series or set of preformed coils in staggered relationship to said first set of coils.

More particularly, it is an object of this invention to provide a mandrel for use in forming coils whereby the coils when formed thereon have a cross sectional configuration at the one end which is complementary to the configuration of the projected cross sections of the stator slots into which the coils are to be inserted, whereby the coils thus formed may be assembled by sliding the coils into the slots from one end of the motor stator or the laminations forming the motor stator may be individually slid onto the coil assembly.

Still another object of this invention is to provide an improved construction and arrangement which facilitates tying strings around the coils so as to facilitate handling of the coils and so as to hold the coils in proper assembled relationship during and after removal of the same from the coil winding mandrel.

Another object of this invention is to provide a method and apparatus which makes it possible to form the coils from a skein of wire.

Other objects and advantages reside in the construction of parts, the combination thereof and the mode of operation, as will become more apparent from the following description.

In the drawing:

Figure 10 is a perspective view of a modified mandrel;

Figure 11 is a side elevational view of a modified wing;

Figure 12 is a view picturing one stage of assembly;

Figure 13 is an end elevational view of a motor stator; and

Figure 14 is an end elevational view showing the coils mounted in the stator slots.

Figure 1:
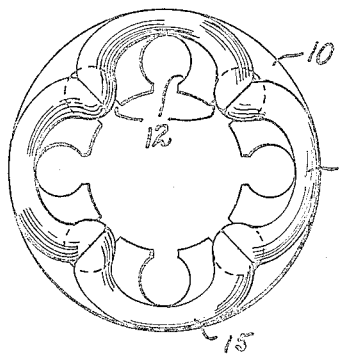
Figure 1 is an end elevational view showing a motor stator having one set of coils comprising one-half of the stator coils mounted in place.
Figure 2:
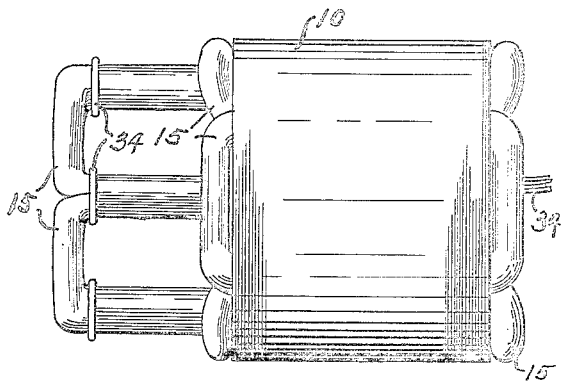
Figure 2 is a side elevational view showing a motor stator having the one group or set of coils assembled in place and having a second group or set of coils partially inserted into the stator slots.

Referring now to the drawing wherein I have shown preferred embodiments of my invention, reference numeral 10 designates a conventional laminated motor stator having coil slots 12 formed therein, as shown in Figure 1. These coil slots are narrowest at the point closest to the motor rotor (not shown) and consequently it is not possible to lay preformed coils directly into the coil slots. For the purposes of illustrating my invention, I have shown a stator of the type having eight slots for accommodating eight individual coils 15, each of which is provided with two sides, so that the sides of two coils are inserted into each stator slot. Figure 1 shows a set of four of the coils mounted in place.

While this invention is applicable for use in motors of all sizes, it is particularly advantageous for use in manufacturing miniature motors of the type commonly used in the aircraft industry because of the difficulty of using one's fingers or any tools for winding the coils directly into the stator slots and because of the impossibility of laying preformed coils directly into the coil slots. It is very difficult, if not impossible, to properly wind these miniature motor stators by the use of the prior art techniques.

By prewinding the coils in a manner to be explained more fully hereinafter, it is possible to form the coils 15 before they are mounted in the stator slots into such a shape that it is possible to slide the coils into place from one end of the slots.

In prewinding the coils, one preferably uses a mandrel or fixture of the type shown in Figures 5, 6, 7 and 8 of the drawing. This mandrel comprises a central shaft 14 on which there is mounted a longitudinally slotted cylindrical core 16 to which a plurality of wing-like elements 18 are adapted to be removably attached. Each of the wing-like elements is provided with a projection 20 which fits into one of the slots 22 formed in the core 16.

Figure 3:
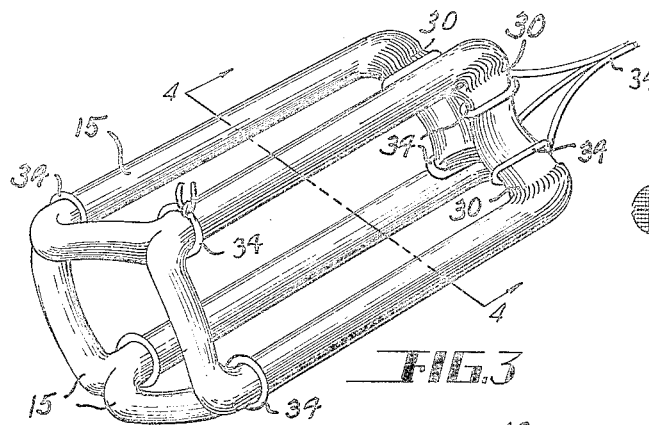
Figure 3 is a perspective view of one group of preformed coils.

For purposes of illustrating the invention, the fixture illustrated in Figures 5 through 8 has been shown as having eight of the wing-like elements 18, whereas a four coil assembly of the type shown in Figure 3 could be made on a mandrel having only four wing-like elements. The wing-like elements 18 may be held in place on the cylindrical core 16 by any suitable means, such as the screws 19 (see Figure 5) which project into tapped recesses 21 in the central core 16.

Figure 9:
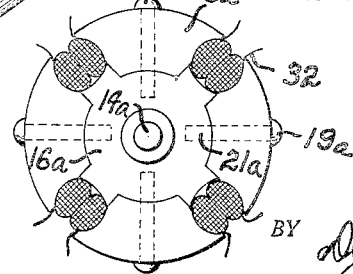
Figure 9 is an end view showing a modified type of mandrel for use in forming coils.

Figure 9 shows a mandrel having only four wing-like elements. Like reference numerals have been used to designate corresponding or like parts in Figures 5 through 9, except that the letter "a" has been added to the reference numerals in Figure 9 to distinguish the parts in Figure 9 from the corresponding parts shown in the other figures.

Figure 4:
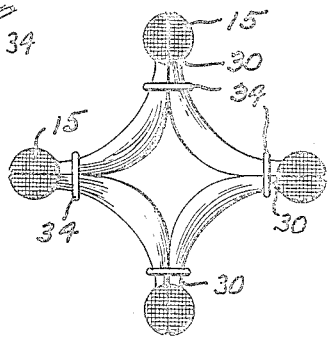
Figure 4 is a fragmentary sectional view taken substantially on line 4—4 of Figure 3 showing the construction of the preformed coils at the leading edge thereof.
Figure 5:
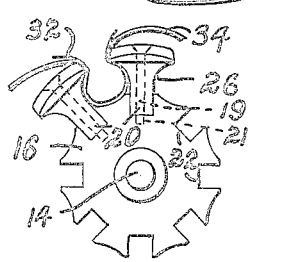
Figure 5 is an end view illustrating the construction of the mandrel used in preforming the stator coils.
Figure 6:
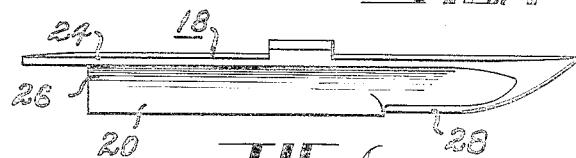
Figure 6 is a side view of one of the wings forming a part of the mandrel.
Figure 7:
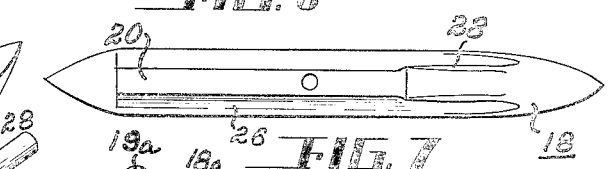
Figure 7 is a bottom view of the wing shown in Figure 6.
Figure 8:
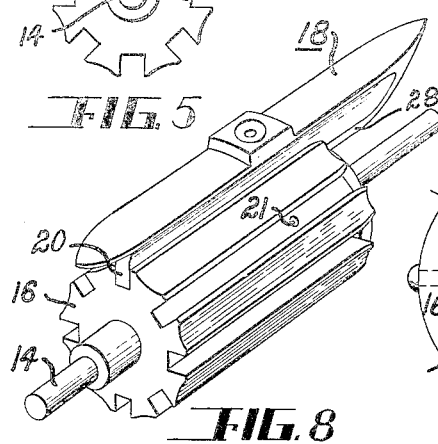
Figure 8 is a fragmentary perspective view of the coil forming mandrel.

As best shown in Figures 5, 6 and 7, each of the elements 18 is provided with a relatively wide outer flange 24 and curved side wall portions 26 which determine the final configuration of the coil assembly. As best shown in Figures 6 and 7 of the drawing, the wing-like elements 18 are wider at the one end than at the other end as indicated at 28. The increased width at 28 serves to reduce the cross sectional area of the coils at the one end thereof, as best indicated by the reference numeral 30 in Figures 3 and 4. By virtue of this construction, the cross sectional configuration of the coils at the point adjacent the portion 28 is less than the projected cross sectional area of the stator slots, with the result that the coils can be inserted endwise into the stator slots.

Prior to the winding operation, sheets of insulation 32 are laid in between the wing members 18, as best shown in Figure 5, so that when the coils have all been wound, they will be wrapped in insulation. This wrapping of insulation further protects the coils as they are inserted into the stator slots. The outer edges of the insulation 32 are, of course, bent over into overlapping relationship with the coil windings before being inserted into the motor stator. As shown in Figure 5, strings 34 may also be laid in place on the mandrel before the coil winding operation and these strings may be used for tying the coils together at the ends, as best shown in Figure 3. While I have shown the edges of the insulation projecting outwardly from the coil slots, they could be placed underneath the wings 18a and then folded over after removal of the wings.

After the wire forming the coils has been wound onto the mandrel, but before the wings 18 are removed so as to release the coils from the mandrel, the coils are coated with a bonding material which is preferably in the form of an insulating varnish or lacquer which serves to hold the coils in the formation shown in Figure 3. The coils may be baked while still on the mandrel or, if desired, the coating may be allowed to partially dry before being removed from the mandrel and baked after being removed from the mandrel but before being inserted into the stator slots. The ends of the strings 34 at the leading end of the coil serve as convenient means for pulling the coils in place.

As best shown in Figure 1 of the drawing, the loop portions of the coils are made long enough so as to make it possible to bend the loop portion of the first set of coils inserted sufficiently so as to clear the empty stator slots 12, so that after the first set of coils has been installed in the motor stator slots, the second set of coils can be inserted without interference from the first set of coils.

By virtue of the above described method and arrangement, it is possible to manufacture a stator in which a maximum amount of copper material may be inserted into a minimum amount of coil slot space. The coil assembly shown in Figure 3 forms an endless ring or spider which when impregnated with the bonding material may be made rigid so as to facilitate handling and installation of the coils. If desired, the coils forming the ring or spider shown in Figure 3 may be slid into place directly from the core of the mandrel 16 merely by lining up the mandrel with the stator after removal of the wing members 18. The coil assembly, as shown in Figure 3, somewhat resembles a bird cage and may be thus designated to distinguish from other types of coil assemblies wherein each coil is an independent unit detached from the adjacent coils.

The bonding material which is applied to the coils prior to the installation of the coils in the motor stator serves to hold the coils in the desired shape during the introduction of the coils into the stator slots. This then eliminates the need for using a special tool or coil feeding device for holding the coils in shape during the process of insertion into the stator slots.

In Figure 10 of the drawing I have shown a modified mandrel for use in forming the coils. This mandrel includes a core 16 which is identical to the core shown in Figure 8 of the drawing and includes a plurality of wing members 18a which are similar in every respect to the wing members 18 described hereinabove except that the one end of the wing members terminates flush with the one end of the core 16 as shown at 36. By forming the wing members as shown in Figure 10 of the drawing, it is possible to wrap the coils by first forming the coils into a large skein 38 and then wrapping the skein onto the mandrel so as to form a series of loops or coils. In many instances electrical elements, stators or rotors are provided with a winding which is formed from a skein or skeins looped in a certain manner through the slots of the stators or rotors to form a group or groups of coils, each group consisting of a phase belt. In these instances the loops or coils are formed by placing different sections or parts of a skein into different slots. According to my invention, a winding of this type may be formed by first looping or placing the skein into the slots of the mandrel shown in Figure 10. As the succeeding sections of the skein are placed into the slots, there is formed a series of coils which constitute one phase belt in accordance with well known practice. Each of the coils thus formed has a number of series connected turns, the number being equal to the number of turns of the skein and the series connection between two turns of the coil being made through the remaining portion of the respective turns of the skein. The procedure of placing the skein into the slots of the mandrel shown in Figure 10 is the same as if the skein were placed directly into the slots of a stator. One or several skeins, that is, a single phase belt or a complete stator winding, may thus be placed on the mandrel which thereafter is impregnated with a bonding material so that upon removal of the wings 18a, the coils will retain the desired shape so that the entire assembly of coils may be inserted endwise into the stator slots.

While I have described an arrangement in which the preassembled coils are slid into place in the slots of a conventional motor stator made up from a series of preassembled laminations, the procedure may be varied slightly by performing the coils and then slipping the individual motor stator laminations 40 into place on the preformed coils which then serve as a mandrel for assembling the stator laminations. As best illustrated in Figures 12 and 14, the preformed coils 42 are so arranged and shaped at the one end that the cross sectional area of the coil assembly substantially corresponds in shape to the cross sectional area of the stator slots. It will be noted from viewing Figure 14 that the connecting ends of the coils are all disposed in such a manner as to clear the solid part of the motor stator as well as the supporting shaft (not shown) of a motor rotor, with the result that it is not necesarsy to reform or bend the end portions of the coils after the coils have been mounted in place on the stator.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of manufacturing a motor stator comprising forming a stator having longitudinally extending coil slots along its inner periphery, preforming stator coils upon a mandrel so as to have a cross sectional configuration at the one end thereof which is complementary to the configuration of the projected cross sections of the stator slots into which the coils are to be inserted, wrapping a sheet of insulating material around the side portions of said coils, coating the coils with bonding material, thus making the coils self supporting, removing the coils from the mandrel, and thereafter sliding the wrapped coils into the stator and into the stator slots from one end of said stator slots.

2. The method of manufacturing a motor stator comprising forming a stator having longitudinally extending coil slots arranged along its inner periphery, preforming stator coils upon a mandrel so as to have a cross sectional configuration at the one end thereof which is complementary to the configuration of the projected cross sections of the stator slots into which the coils are to be inserted, impregnating the coils with a bonding material so as to retain said configuration during insertion into the motor stator slots, removing the coils from the mandrel, sliding the coils into the slots from one end of said stator, and thereafter bending end portions of the coils into alignment with the solid end wall portion of the stator so as to hold the coils in place.

3. The method of manufacturing a preformed coil assembly which comprises winding a plurality of coils about a central axis upon a mandrel with the sides of adjacent coils arranged in abutting relationship and with the connecting end portions at the one end of the coils extending in a direction towards the central axis, impregnating the coils with a bonding material so as to hold the coils in said relationship for insertion into a motor stator, removing the coils from the mandrel, followed by endwise insertion of the coils into the stator.

4. The method of manufacturing a motor stator having a multiplicity of coils which comprises forming a stator with axially extending coil slots in its inner surface, preforming coils in a mandrel prior to insertion into the stator slots with adjacent edges of the coils in abutting relationship whereby the coils form an endless ring, impregnating the coils with a bonding material so as to hold the coils in said ring formation, removing the preformed coils from the mandrel, and thereafter inserting the coils endwise into the stator slots.

5. The method of manufacturing a preformed coil assembly for an element of an electric train by means of a mandrel having axially extending coil slots which comprises inserting insulating material in said coil slots, winding a plurality of coils into said slots with the sides of adjacent coils arranged in abutting relationship and with the connecting end portions at the one end of said coils extending in a direction towards the central axis, applying a bonding material to the coils while in said coil slots, thus retaining the coil configuration, baking the coil assembly, removing the coils from the mandrel, followed by endwise insertion of the coils into an element of the electric machine.

6. The method of manufacturing a motor stator comprising forming a plurality of individual stator laminations having coil slots adjacent their inner periphery, preforming stator coils upon a mandrel so as to have a cross sectional configuration at the one end of the coils which is complementary to the configuration of the projected cross sections of the stator slots, applying a bonding material to the coils thereby retaining the formation of the coils, removing the coils from the mandrel and thereafter sliding the individual stator laminations endwise onto said coils.

7. The method of winding stator coils for use in an electric motor which comprises producing a skein of conductors, progressively feeding the skein radially into slots of a forming mandrel so as to preform the stator windings, baking the coils in the presence of a bonding and insulating material, removing the coils from the mandrel and thereafter inserting the coils thus formed endwise into the slots of a motor stator.

8. The method of manufacturing a motor stator having a stator provided with longitudinally extending internally disposed coil slots by the use of a mandrel having a core removably supporting wing members, the core and wing members being so shaped that the coils wound thereon have a cross sectional configuration at one end thereof that is complementary to the cross section of the stator slots, said method including the steps of winding coils on said core, applying a material to the coils which retains the configuration of the coils, removing the supporting wing members from the core leaving the wound coils intact on the core, aligning the core with the wound coils thereon with the stator slots so that the sides of the coils register with the slots, and sliding the coils endwise from the core into the slots to thereby position the coils as a field winding in the stator.

References Cited in the file of this patent

UNITED STATES PATENTS

| | | |
|---|---|---|
| 706,508 | Armstrong | Aug. 12, 1902 |
| 829,801 | Pratt et al. | Aug. 28, 1906 |
| 1,365,015 | Zwicker | Jan. 11, 1921 |
| 1,479,285 | Cullin | Jan. 1, 1924 |
| 1,697,134 | Neely | Jan. 1, 1929 |
| 1,772,851 | Apple | Aug. 12, 1930 |
| 1,895,427 | Steuer et al. | Jan. 24, 1933 |
| 2,269,678 | Mauerer | Jan. 13, 1942 |
| 2,395,736 | Grundmann | Feb. 26, 1946 |
| 2,400,008 | Korte | May 7, 1946 |
| 2,426,090 | Gartner | Aug. 19, 1947 |
| 2,432,267 | Adamson | Dec. 9, 1947 |
| 2,445,986 | Adamson | July 27, 1948 |
| 2,561,352 | Ferris et al. | July 24, 1951 |
| 2,580,293 | Gier et al. | Dec. 25, 1951 |

FOREIGN PATENTS

| | | |
|---|---|---|
| 11,729 | Great Britain | of 1903 |